US012180711B2

(12) United States Patent
Williams, II

(10) Patent No.: US 12,180,711 B2
(45) Date of Patent: Dec. 31, 2024

(54) ROOF DRAIN OVERFLOW COVER WITH SENSOR

(71) Applicant: Matthew Curtis Williams, II, Sonora, KY (US)

(72) Inventor: Matthew Curtis Williams, II, Sonora, KY (US)

(*) Notice: Subject to any disclaimer, the term of this patent is extended or adjusted under 35 U.S.C. 154(b) by 422 days.

(21) Appl. No.: 17/711,000

(22) Filed: Mar. 31, 2022

(65) Prior Publication Data

US 2022/0316214 A1 Oct. 6, 2022

Related U.S. Application Data

(60) Provisional application No. 63/304,392, filed on Jan. 28, 2022, provisional application No. 63/169,149, filed on Mar. 31, 2021.

(51) Int. Cl.
*E04D 13/04* (2006.01)
*G01F 23/00* (2022.01)
*G01F 23/62* (2006.01)

(52) U.S. Cl.
CPC ..... *E04D 13/0409* (2013.01); *G01F 23/0007* (2013.01); *G01F 23/62* (2013.01); *E04D 2013/0413* (2013.01); *E04D 2013/0422* (2013.01)

(58) Field of Classification Search
CPC ........ E04D 13/0409; E04D 2013/0413; E04D 2013/0422; G01F 23/0007; G01F 23/62
See application file for complete search history.

(56) References Cited

U.S. PATENT DOCUMENTS

| 4,961,848 | A | 10/1990 | Logsdon |
| 5,378,356 | A | 1/1995 | Logsdon |
| 6,631,588 | B1 | 10/2003 | Distler |
| 7,407,574 | B2 | 8/2008 | Robinson |
| 7,614,198 | B1 | 11/2009 | Piskula |
| 8,557,109 | B1 | 10/2013 | Sutherland |
| 10,171,892 | B2 | 1/2019 | Petrachek |
| 10,519,666 | B2 * | 12/2019 | Huber ................. E03F 5/06 |
| 2006/0033629 | A1 | 2/2006 | Froeter |
| 2010/0025312 | A1 | 2/2010 | Martin |
| 2012/0062384 | A1 | 3/2012 | McDanal |

* cited by examiner

*Primary Examiner* — Waqaas Ali
(74) *Attorney, Agent, or Firm* — Carrithers Law Office, PLLC; David W. Carrithers

(57) ABSTRACT

The roof drain overflow cover with sensor cooperatively engages and covers a conventional roof drain cap cover to prevent trash from reaching and clogging the conventional roof basket cover and drain. Accumulating trash builds up on the screen of the overflow prevention device causing a doughnut shaped buoy connected to a trash tray to rise. The trash tray is retained to a base with magnets. When the water reaches a predetermined level, the doughnut shaped buoy rises pulling the trash tray away from the base allowing water to flow to the conventional roof drain basket and activating an overflow sensor and a control module. The control module is in communication with the water flow sensor and includes an indicator which is activated when the water flow sensor detects the detachment of the trash tray from the base indicating a potential flooding situation with the roof drainage system.

5 Claims, 3 Drawing Sheets

ROOF DRAIN OVERFLOW COVER WITH SENSOR

REFERENCES TO RELATED APPLICATIONS

This application claims priority from U.S. Provisional Application Ser. No. 63/304,392 filed on Jan. 28, 2022 and U.S. Provisional Application Ser. No. 63/169,149 filed on Mar. 31, 2021 both of which are incorporated by reference in its entirety.

FIELD OF THE DISCLOSURE

The present invention relates to roof drains to prevent flooding of roofs.

BACKGROUND OF THE INVENTION

Commercial and industrial buildings are typically constructed with flat or near flat roofs. Because these buildings do not have much if any of a pitch to the roof the collection of water on the roof surface results from rain and melting snow can present a structural load resulting in damage to the roof structure or rooms below. Most commercial and industrial building standards require that roofs of this type include drains positioned at locations that ensure the majority of water accumulation may be removed from the roof through a drainage plumbing system.

Typical roof drains are installed on flat roofs by cutting a hole through the roof deck and installing a drain. The drain typically connects with drain pipes that carries the water away. The drain apparatus typically include flashing and a collar that is attached using an adhesive or sealant to create a water tight seal preventing leakage at the site of the drain. Typical drain structures include some form of drain ring and under deck clamping ring or structure that holds the drain in place and prevents its inadvertent removal or dislodgement from its installed position. The opening of the roof drain is typically covered by some form of grating or strainer structure to prevent the ingestion of large objects into the drain plumbing system. In most roof drain structures this strainer or grate takes the form of a hemispherical strainer such as an inverted dome having openings there through to prevent or minimize the occurrence of obstruction of the roof drain through the accumulation of leaves and other debris that may accumulate on the roof.

Despite the inclusion of a strainer or other grating structure, many roof drains still become plugged or obstructed from removing the accumulated water from the roof of the building. These obstructions can occur as a result of the collection of debris around or over the grate or strainer structure. Melting ice in the winter may also obstruct water flow resulting in blockage of the roof drain system during winter months as a result of icing near the roof level of the open areas of the strainer. Minor obstructions that result in the reduction in the rate of water removal from the roof may also result in undo stress on the roof structure that may endanger its integrity. Additionally, even unobstructed roof drains may not be able to remove water at a rate to prevent its undue accumulation during periods of heavy storms and intense rainfall.

New buildings do call for overflow drains designed to hold a twelve foot lake if the drain is stopped-up, and are connected to the same down pipe as the drain pipe which is usually six feet away from a sumped drain. The sump has a four inch pipe on it which also holds a twelve foot lake and is connected to the same down pipe as the drain pipe. However not all buildings have overflow drains. A lot of roofs are usually wet around the roof drains from ponding which lets water vapor move thorough the insulation resulting in damage to the electrical system and roof and wall insulation. For instance, a low sloped roof with no walls having just an edge of roof and drains in the middle of the roof if trash gets around it, ponds up to a deep level pooling water on the roof.

Conventional backup roof drains are typically constructed in the same manner as the primary roof drains, but include a structure that prohibits the drainage of water through the backup roof drainage system until the level of the water reaches a predetermined depth. Typically the entry ports or slots on the backup roof drains are positioned at a height above the roof surface. This height is preferably chosen based upon the roof construction such that the weight of the water at that given height is well within the load carrying of the roof structure. The separate drainage system ensures that failure of the primary roof drain system due to an obstruction in the drainage system downstream from the roof drains will not effect the ability of the backup roof drain system to remove the water that accumulates above a given depth.

Conventional roof drain systems collect water and carry away from a roof but do not indicate to a building owner (or tenant) the status of the system. Where the primary roof drain is plugged or malfunctioning and the backup drain is operating to relieve the roof of water, the need to maintain either one or both of the drains needs to be communicated to the party responsible for maintenance of the structure so that measures can be taken to unplug or fix the primary drain.

The instant invention includes a system capable of notifying a building owner or tenant that a backup drain has been called upon and/or that the primary system has been compromised.

SUMMARY

The roof drain overflow cover with sensor cooperatively engages and covers a conventional roof drain basket cover to prevent trash from reaching and clogging the conventional roof basket cover and drain. Accumulating trash builds up on the screen of the overflow prevention device causing a doughnut shaped buoy connected to a trash tray to rise. The trash tray is retained to a base with magnets. When the water reaches a predetermined level, the doughnut shaped buoy rises pulling the trash tray away from the base allowing water to flow to the conventional roof drain basket and activating an overflow sensor and a control module. The control module is in communication with the water flow sensor and includes an indicator which is activated when the water flow sensor detects the detachment of the trash tray from the base indicating a potential flooding situation with the roof drainage system.

The roof drain overflow cover is a device which goes over and around an existing drain basket and ring to catch any kind of trash before it gets to the existing roof basket. Once trash has accumulated and built up on the screen of the invention the water will raise up to a foam doughnut or buoy which will be coated with a long lasting coating. The buoy will be connected to a screen and trash tray that will rise when the water gets high enough to pull it away from the magnets that hold it down to the base plate that seals it so the roof.

The roof drain overflow cover has a base plate that is sealed to the roof and around the roof drain. The trash tray is held down to the base plate my magnets. When the trash builds up around the screen, the water will rise up to the donut float causing it to pop up from magnets and move setting on stairs which will let water run into the drain at roof level. When the donut buoy pops up it also sets off a magnet switch that will send a text message and emails to the addresses of the building and which drain it effected to the designated entity providing a location, time, and date or the report. The sensor requires a magnetic switch, a wifi signal, and triple A batteries.

Water pressure created from ponding of water on the roof pushes the trash tray up for it to move one way or the other over four sets of steps. When it raises up it releases a magnet switch sending a text message and email to whoever is selected in accordance with a computer program or application receive the information and to provide an alert that the trash needs to be cleaned around the drain and the alarm system parameters need to be reset.

The invention lets the accumulated water drain at roof level to the existing roof drain and alerts the maintenance group regarding the status of the roof drain and water accumulation when no one is on the roof.

More particularly, the roof drain overflow cover and WIFI sensor module have an annular base plate having a center opening and inner edge for attachment to a roof. The annular base plate supports a circumferential annular sieve tray serving as a "trash tray". The annular sieve tray comprises an annular disc having a plurality of teeth projecting from the periphery thereof and a plurality of perforations such as slits or holes therethrough, and includes an open center portion surrounded by an inner edge defining the trash tray affixed to the base plate. A conventional roof drain strainer cap is disposed in the center of the annular sieve tray and annular base plate attaching to roof having a watertight seal with the surface of the roof formed by sealing with a sealant such as a caulk, cement, glue, rubber seam tape, PVC tape, or other adhesive means and is stripped in with the roofing materials which are consistent with those used on the roof A foam donut buoy surrounds the roof drain strainer cap. A vertically positioned circumferential screen is contiguous to the annular sieve plate and spaced apart a selected distance from the inner edge affixed to an inner solid portion surface of the annular sieve plate. A foam donut buoy comprising an annular foam material has a lower inner wall portion attaching to an upper screen portion. Floating of the foam donut buoy raises the screen and annular sieve plate attached thereto. The WIFI sensor module is supported by a pair of spaced apart aligned module support arms whereby the WIFI module is spaced apart from and centered over the top of roof cap.

A pair of wires extend from the WIFI module down the support arms to a pair of spaced apart opposing magnetic switches affixed to a top surface of the inner edge portion of the annular base which hold the annular sieve plate thereto until a sufficient level of water floats the annular buoy.

It is an object of the present invention to prevent roof collapse due to the accumulation of water on a roof due to clogged drains.

It is an object of the present invention to provide a overflow device having a sensor and means for communicating the status of the level of the water of a roof for a particular roof drain to a maintenance center and selected individuals.

It is an object of the present invention for the overflow cover prevention and sensor device to have a communication module mounted over the top of the roof cap in electrical communication with sensors by a wire attaching to the donut buoy for sending email, phone, or text messages.

It is another objet of the present invention for the annular donut buoy and annular sieve tray to remain in the resting position with magnet holding down the donut buoy until the level of the water raises the donut buoy enough to move it over the rear steps.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

A better understanding of the present invention will be had upon reference to the following description in conjunction with the accompanying drawings in which like numerals refer to like parts throughout the several views and wherein.

DETAILED DESCRIPTION OF THE PREFERRED EMBODIMENT

Figure 1:
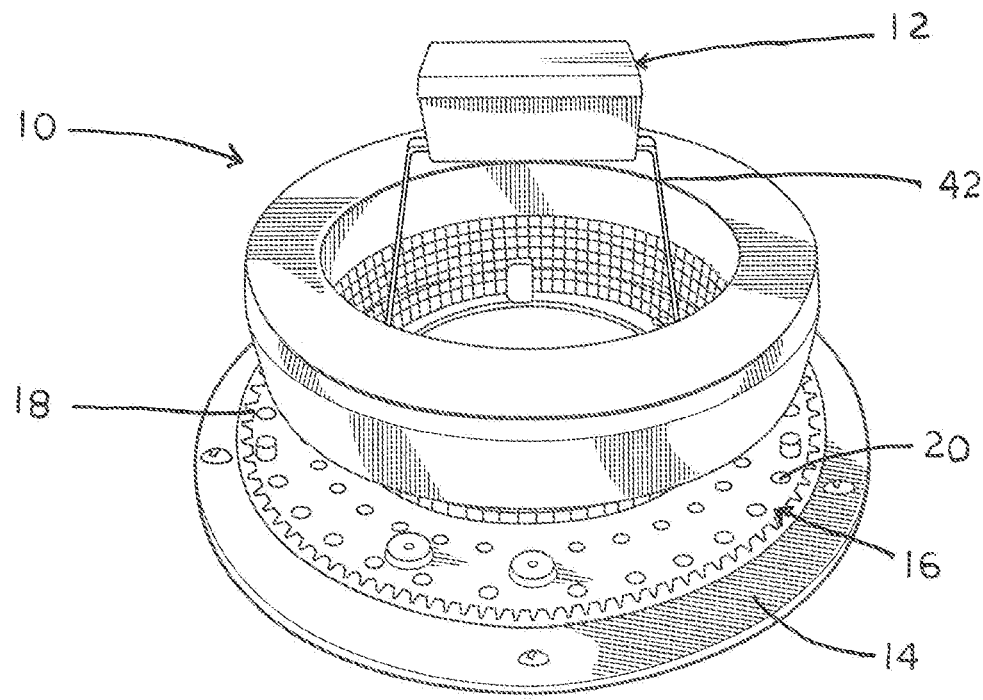
FIG. 1 is a perspective view of the roof drain overflow cover device and sensor.

For the purposes of promoting an understanding of the principles of the invention, reference will now be made to the embodiment illustrated in the drawings and specific language will be used to described the same. It will nevertheless be understood that no limitation of the scope of the invention is thereby intended, such alterations and further modifications in the illustrated device, and such further applications for the principles of the invention as illustrated therein being contemplated as would normally occur to one skilled in the art to which the invention relates.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

As used herein, the term "about" can be reasonably appreciated by a person skilled in the art to denote somewhat above or somewhat below the stated numerical value, to within a range of ±10%.

The information included in this section, data or specifications, including any references cited herein and any description or discussion thereof, is included for exemplary purpose only and is not to be regarded as subject matter by which the scope of the invention as defined in the claims appended hereto is to be bound.

The following text sets forth a broad description of numerous different embodiments of present disclosure. The description is to be constructed as exemplary only and dose not describes every possible embodiment since describing every possible embodiment would be impractical if not impossible. It will be understood that any feature, characteristic, component, composition, ingredient, product, step or methodology described herein can be deleted, combined with or substituted for, in whole or part, any other feature, characteristic, composition, ingredient, product, step or methodology described herein. Numerous alternative embodiments could be implemented, using either current technology or technology developed after the disclosure date of the invention.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The present invention includes a water level sensor attached to the trash tray for indicating a selected volume of water has accumulated on the roof, a communication system disposed within a housing positioned on the on support member above the drain for transmitting measurement data received from the water level sensor.

Figure 2:
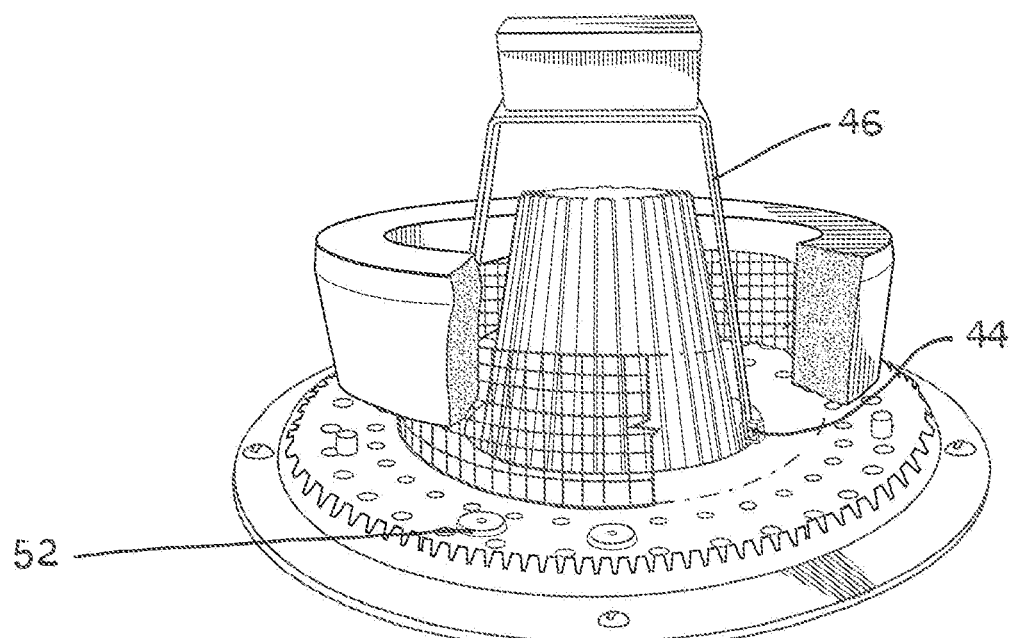
FIG. 2 is a cutaway view showing a foam donut buoy and circumferential screen surrounding a roof drain strainer cap.
Figure 3:
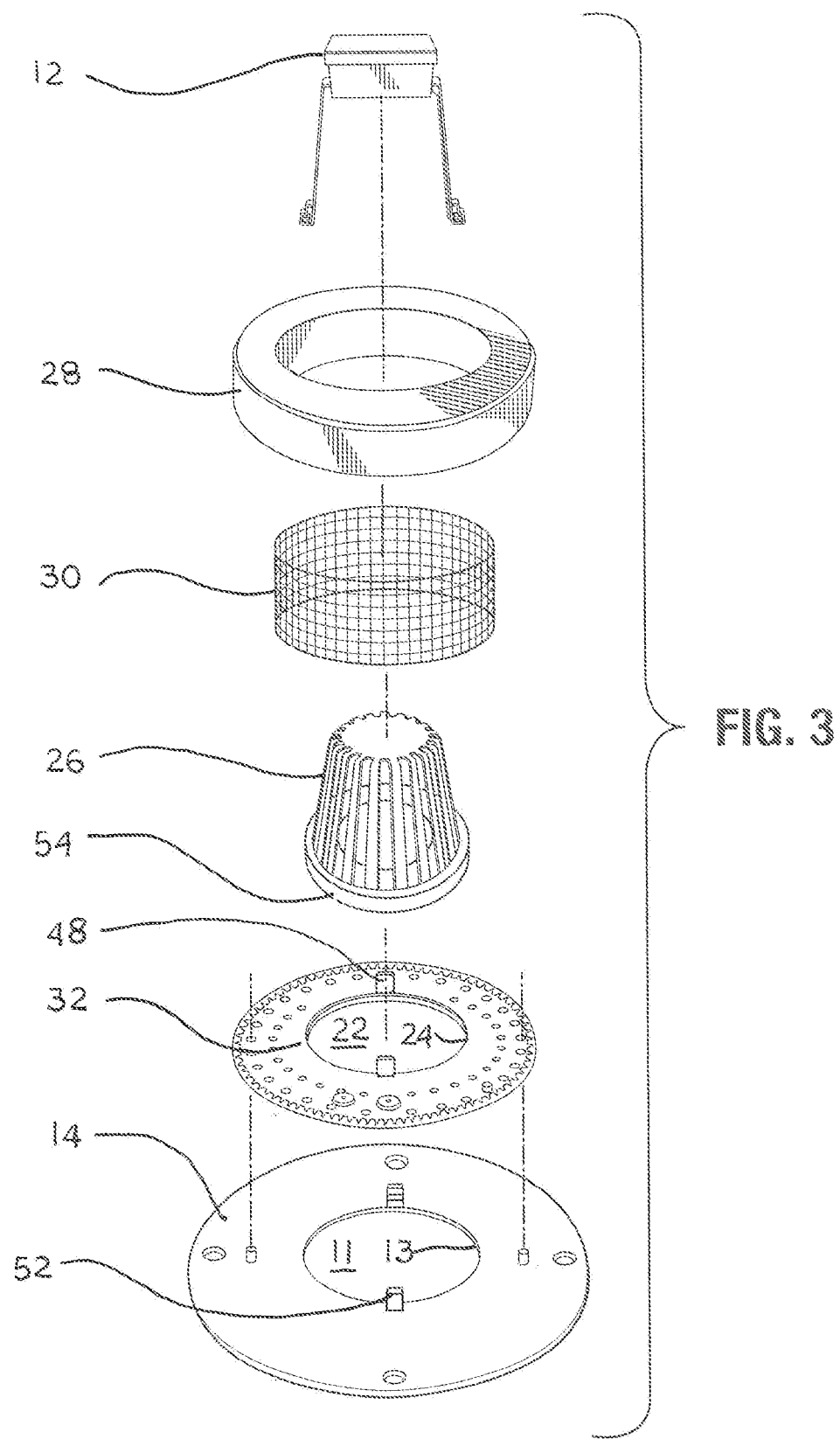
FIG. 3 is an exploded view of the roof drain overflow cover and sensor device showing the sensor housing and magnet switch module including wiring extending from the magnet to the module, foam buoy, circumferential screen mounting to a trash tray, roof cap, trash tray including drain holes, and base plate with magnets and positioning members.

FIGS. 1-3 show the roof drain overflow cover 10 and WIFI sensor module 12 showing an annular base plate 14 having a center opening 11 and inner edge 13 for attachment to a roof. The annular base plate supports a circumferential annular sieve tray 16 serving as a "trash tray". The annular sieve tray 16 comprises an annular disc having teeth 18 projecting from the periphery thereof and which may be up-turned around the edges, and a plurality of perforations such as slits or holes therethrough, and includes an open center portion 20 surrounded by an inner edge 22 defining the trash tray affixed to the base plate. A conventional hat shaped roof drain strainer cap 26 is disposed in the center of the annular sieve tray and annular base plate 14 attaching to roof 2 having a watertight seal with the surface of the roof formed by sealing with a sealant such as a caulk or adhesive and is stripped in with the roofing materials which are consistent with those used on the roof A closed cell foam donut buoy 28 surrounds the roof drain strainer cap. The annular foam buoy may be .composed of STYROFOAM having a coating. A vertically positioned circumferential screen 30 is contiguous to the annular sieve plate and spaced apart a selected distance from the inner edge 24 affixed to an inner solid portion 32 surface of the annular sieve plate. The circumferential screen preferably comprises ½ inch screen for catching leaves or trash disposed between the annular donut buoy made of foam and the annular sieve tray trash tray. The foam donut buoy 34 comprising an annular foam material has a lower inner wall portion 36 attaching to an upper screen portion 38. Floating of the foam donut buoy 34 raises the screen 30 and annular sieve plate attached thereto.

By utilizing the screen together with the annular sieve tray, debris blocking the flow of water is lifted up with the annular sieve tray, rather than being able to accumulate under the tray. The steps enable the float and annular sieve tray to lower upon drainage of the water to an acceptable level, whereby water flows under the annular sieve tray supported by the steps.

The WIFI sensor module 40 is supported by a pair of spaced apart aligned module support arms 42 whereby the WIFI (including transmitter and receiver) and magnetic switch module 40 is spaced apart from and centered over the top of roof cap 26. A pair of wires 46 extend from the WIFI module down the support arms to a pair of spaced apart opposing magnetic switches 44 affixed to a top surface of the inner edge portion of the annular base which hold the annular sieve plate thereto until a sufficient level of water floats the annular buoy. A pair of spaced apart aligned magnets 48 affixed to the top surface of the inner edge of the annular sieve tray is in magnetic communication and cooperative engagement with the magnet switch 44 extending from wires mounting to the annular base plate. The magnets form steps for supporting the roof drain stainer cap.

Figure 4:
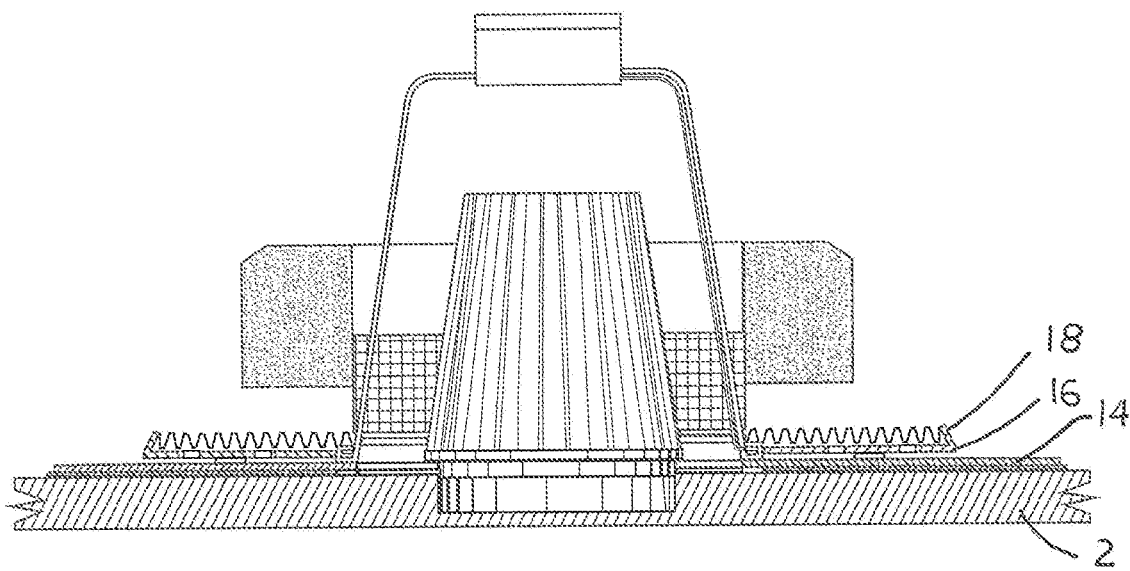
FIG. 4 is a side cutaway view of the roof drain overflow cover and sensor device with the donut buoy, circumferential screen, and trash tray resting on the base plate.
Figure 5:
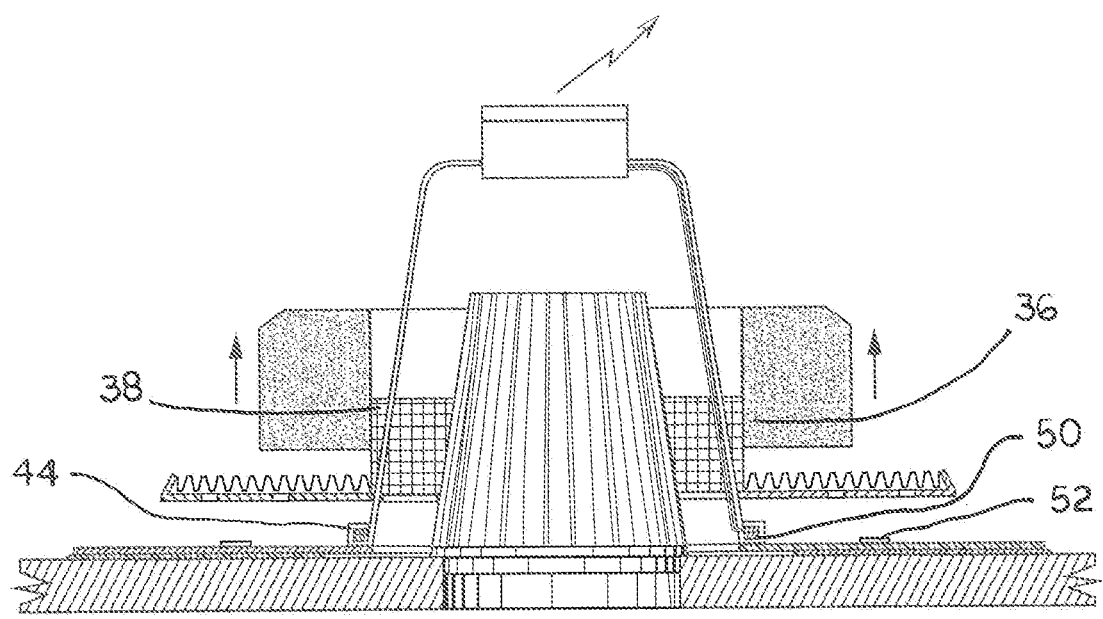
FIG. 5 is a side cutaway view of the roof drain overflow cover and sensor device with the donut buoy, circumferential screen, and trash tray floating above the base plate in an overflow position.

As best shown in FIGS. 4 and 5, the annular base plate is seamlessly affixed to the surface of the roof 2 with adhesive caulk or other means rather than a nail or screw. The annular base plate having a center opening is placed over an existing roof drain strainer cap and attached to the surface of the roof with retaining means such as cement, caulk, glue, rubber seam tape, PVC tape or other adhesive means and is stripped in with the roofing materials which are consistent with those used on the roof.

The annular base plate includes four spaced apart aligned holes around the outer periphery for affixing to the roof support structure. At least two annular sieve tray support members 50 may be spaced apart in opposed alignment on the top portion adjacent the inner edge of the annular base plate to support the annular sieve tray so that when water rises and the annular donut buoy floats upward pulling the annular sieve tray up, the tray will rest upon the support members 50 when the level of the water subsides. The annular base plate may be composed of a magnetic material such as steel or have magnets or magnetic material strips or pads 52 such as steel disposed onto the surface thereof for cooperative magnetic engagement with opposing magnets affixed to the underside of the annular sieve tray 16 or for cooperative engagement with a annular sieve tray 16 composed of a magnetic material. The pads or steps 50 support the annular sieve tray once raised by the water level floating the buoy. Typically, four steps are mounted on the annular base plate which cooperatively engage the drain cap.

The roof drain strainer cap includes a rim 54 with attachment points for affixing to a roof and is preferably composed of plastic or another relatively low density material.

The perforated barrier such as the cylindrical screen 30 attaching to the lower portion of the inner wall of the donut buoy allows the annular donut buoy to rise when the water level rises and lifts the donut buoy, screen and annular sieve tray to permit the water to discharge through the holes in annular sieve tray and through the roof drain strainer cap and drain, in addition the raising of the donut buoy completes a circuit to send a text and email or other communication to create an alert to a maintenance group to enable a roofing company or plumber to investigate, fix, and/or repair the drain system.

The overflow cover sensor monitors the condition of the backup roof drainage system and immediately notifies a building owner (or tenant), maintenance, or designated party by electronic means such as an text, electronic mail, audio, and/or visual message via WIFI if the backup roof drainage system is called upon to convey water from a building's roof. The sensor may also indicate if the batteries powering the system are depleted. The monitor is shown installed in a housing powered by batteries and/or a solar panel on a support structure over the drainage device above the water level in electrical communication with sensors attaching to the trash tray which are in electrical communication with magnets holding the trash tray to the base plate.

Once the magnets are separated by the float apparatus during a high water condition, the sensor sends a signal to the receiver such as a smart phone, tablet, computer or other electrical device notifying a selected individual that it is likely that the primary drain and/or the primary roof drainage system has malfunctioned and/or is plugged by debris. The building maintenance person can take the necessary steps to remedy the problem or problems with the primary drain and/or drainage system The overflow cover sensor comprises a housing, a magnet, a water flow sensor, and a control module which is disposed in the housing. The control module is operatively in communication with the water flow sensor. In the illustrated embodiment, such communication is performed by leads or wires that couple the control module and the contacts. It is contemplated that other types of communication between the control module and the sensor can be employed. For example, the control module and the water flow sensor can communicate wirelessly with the addition of appropriate transmitter and receiver circuitry.

The foregoing detailed description is given primarily for clearness of understanding and no unnecessary limitations are to be understood therefrom, for modification will become obvious to those skilled in the art upon reading this disclosure and may be made upon departing from the spirit of the invention and scope of the appended claims. Accordingly, this invention is not intended to be limited by the specific exemplifications presented herein above. Rather, what is intended to be covered is within the spirit and scope of the appended claims.

I claim:

1. A roof drain overflow cover, consisting of:
an annular base plate having a center opening and an inner edge for attachment to a roof;
a circumferential annular sieve tray supported by said annular base plate in cooperative magnetic engagement therewith;
said annular sieve tray comprising an annular disc having a plurality of teeth projecting from the periphery thereof and a plurality of perforations there through, and an open center portion surrounded by said inner edge;
a roof drain strainer cap disposed in the center of said annular sieve tray and said annular base plate attaching to said roof and having a watertight seal with a surface of said roof formed by sealing with a sealant;
a foam donut buoy surrounding said roof drain strainer cap;
a vertically positioned circumferential screen contiguous to said annular sieve plate and spaced apart a selected distance from said inner edge and affixed to an inner solid portion of a surface of said annular sieve plate;
said foam donut buoy comprising an annular foam material includes a lower inner wall portion attaching to an upper screen portion;
a WIFI magnetic sensor module supported by a pair of spaced apart aligned module support arms whereby said WIFI magnetic sensor module is spaced apart from and centered over a top of said roof drain strainer cap; and
whereby rising water floating said foam donut buoy raises said annular sieve tray and said screen breaking a magnetic connection between said annular sieve plate and said annular base plate and sending a signal to said WIFI magnetic sensor module to notify a user of an water overflow condition.

2. A roof drain overflow cover, comprising:
an annular base plate having a center opening and an inner edge for attachment to a roof;
a circumferential annular sieve tray supported by said annular base plate in cooperative magnetic engagement therewith;
said annular sieve tray comprising an annular disc having a plurality of teeth projecting from the periphery thereof and a plurality of perforations there through, and an open center portion surrounded by said inner edge;

a roof drain strainer cap disposed in a center of said annular sieve tray and said annular base plate attaching to said roof and having a watertight seal with a surface of said roof formed by sealing with a sealant;

a buoy surrounding said roof drain strainer cap;

a vertically positioned circumferential screen contiguous to said annular sieve plate and spaced apart a selected distance from said inner edge and affixed to an inner solid portion of a surface of said annular sieve plate;

said buoy having a lower inner wall portion attaching to an upper screen portion of said circumferential screen;

a WIFI magnetic sensor module supported by spaced apart aligned module support arms
whereby said WIFI magnetic sensor module is spaced apart from and centered over a top of said roof drain strainer cap; and whereby rising water floating said buoy raises said annular sieve tray and said screen breaking a magnetic connection between said annular sieve plate and said annular base plate and sending a signal to said WIFI magnetic sensor module to notify a user of a water overflow condition.

3. The roof drain overflow cover of claim 2, wherein said buoy comprises an annular foam material.

4. The roof drain overflow cover of claim 2, wherein said WIFI magnetic sensor module is powered by a battery.

5. The roof drain overflow cover of claim 2, wherein said WIFI magnetic sensor module is powered by a solar panel.

* * * * *